(12) United States Patent  (10) Patent No.: US 8,874,484 B2
Mizumachi et al.  (45) Date of Patent: Oct. 28, 2014

(54) METHOD AND SYSTEM FOR DISTRIBUTING INTELLIGENT CONTENT

(75) Inventors: Yuji Mizumachi, Kurume (JP); Koichi Ohtani, Kasukabe (JP)

(73) Assignee: Koichi Ohtani, Kasukabe-shi, Saitama (JP)

( * ) Notice: Subject to any disclaimer, the term of this patent is extended or adjusted under 35 U.S.C. 154(b) by 1294 days.

(21) Appl. No.: 10/467,804

(22) PCT Filed: Apr. 30, 2002

(86) PCT No.: PCT/JP02/04305
§ 371 (c)(1),
(2), (4) Date: Aug. 12, 2003

(87) PCT Pub. No.: WO02/091267
PCT Pub. Date: Nov. 14, 2002

(65) Prior Publication Data
US 2004/0059679 A1  Mar. 25, 2004

(30) Foreign Application Priority Data
May 7, 2001 (JP) .................. 2001-136576

(51) Int. Cl.
*G06F 21/00* (2013.01)
*G06Q 40/00* (2012.01)
*G06Q 30/02* (2012.01)
*G06Q 30/06* (2012.01)

(52) U.S. Cl.
CPC .............. *G06Q 30/02* (2013.01); *G06Q 30/06* (2013.01)
USPC ............................................. 705/52; 705/35

(58) Field of Classification Search
USPC ....................................... 705/26, 30
See application file for complete search history.

(56) References Cited

U.S. PATENT DOCUMENTS 5,884,280 A * 3/1999 Yoshioka et al. ............... 705/26
5,918,215 A * 6/1999 Yoshioka et al. ............... 705/30
5,950,176 A * 9/1999 Keiser et al. ............... 705/36 R
(Continued)

FOREIGN PATENT DOCUMENTS

EP  1 120 715  8/2001
JP  11-15878  1/1999
(Continued)

OTHER PUBLICATIONS

Yoshiko Owada, et al., "Patro Net", ZDNet Japan MacWire Online, Dec. 18, 2000.
(Continued)

*Primary Examiner* — Evens J Augustin
(74) *Attorney, Agent, or Firm* — Muncy, Geissler, Olds & Lowe, P.C.

(57) ABSTRACT

An intellectual contents distribution method distributes intellectual contents from a computer via a network. The contents provided from a contents provider are stored in a computer 1, along with support results from at least one supporter relating to the contents. The contents are transmitted to a system of a purchaser via a network in response to the purchaser's request. Also, purchase results of the contents are stored in the computer. Further, the computer computes earnings to be returned to the contents provider and earnings to be returned to each supporter based on a predetermined computational formula by using the support results and the purchase results stored in the computer.

18 Claims, 12 Drawing Sheets

(56) References Cited

U.S. PATENT DOCUMENTS

| | | | |
|---|---|---|---|
| 6,282,653 B1 * | 8/2001 | Berstis et al. | 726/26 |
| 6,385,596 B1 * | 5/2002 | Wiser et al. | 705/51 |
| 6,505,174 B1 * | 1/2003 | Keiser et al. | 705/36 R |
| 6,792,411 B1 * | 9/2004 | Massey, Jr. | 705/35 |
| 7,487,123 B1 * | 2/2009 | Keiser et al. | 705/37 |
| 2002/0038270 A1 * | 3/2002 | Shin et al. | 705/36 |
| 2002/0138291 A1 * | 9/2002 | Vaidyanathan et al. | 705/1 |
| 2002/0138576 A1 * | 9/2002 | Schleicher et al. | 709/205 |
| 2002/0165811 A1 * | 11/2002 | Ishii et al. | 705/36 |
| 2003/0005428 A1 * | 1/2003 | Roman | 725/1 |
| 2003/0131252 A1 * | 7/2003 | Barton | 713/193 |
| 2004/0260575 A1 * | 12/2004 | Massey, Jr. | 705/1 |
| 2005/0080705 A1 * | 4/2005 | Chaganti | 705/36 |
| 2006/0095792 A1 * | 5/2006 | Hurtado et al. | 713/189 |
| 2006/0173761 A1 * | 8/2006 | Costakis | 705/35 |
| 2008/0133417 A1 * | 6/2008 | Robinson | 705/52 |

FOREIGN PATENT DOCUMENTS

| | | |
|---|---|---|
| JP | 11-015878 | 1/1999 |
| JP | 2000-306008 | 11/2000 |
| JP | 2001-101198 | 4/2001 |
| WO | 01/02968 | 1/2001 |

OTHER PUBLICATIONS

Straus, N., "The Top Life", The New York Times, Mar. 2, 2000.
Yoshiko Owada, et al., "Shin Sedai Musician Site "PatroNet" o Miru, Kiku, Asobu," ZDnetJAPAN MacWIRE Online [online], Dec. 18, 2000, [Retrieval date May 22, 2002].
Straus, N., The Pop Life. The New York Times. Mar. 2, 2000.
Mobile Media Magazine, Apr. 4, 2001, pp. 1-4.
Mobile Media Magazine, Jan. 1, 2001, pp. 1-5.

* cited by examiner

FIG.2
(a)
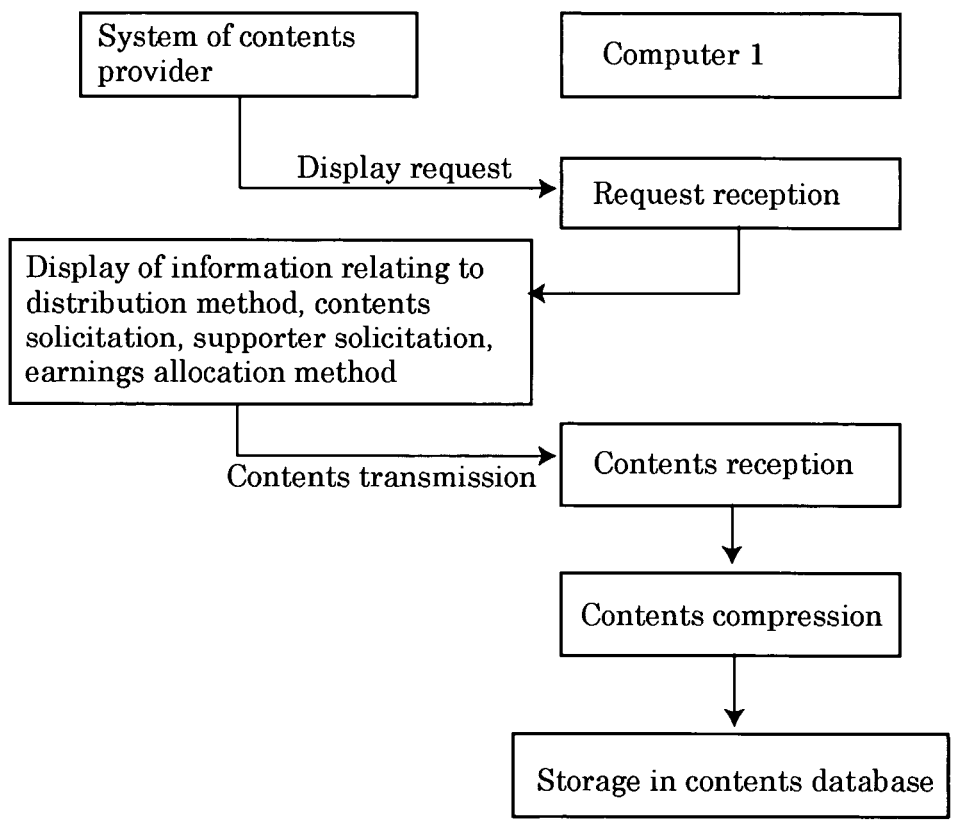
(b)
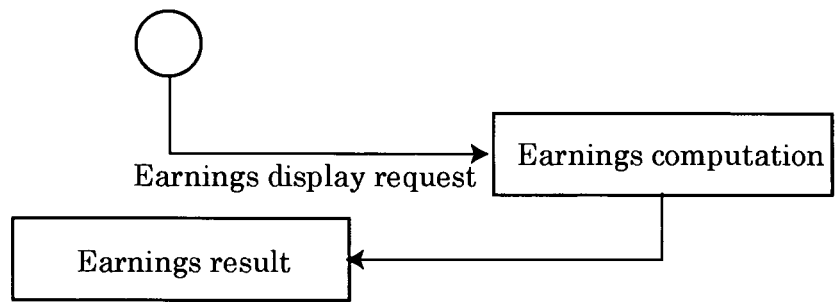

FIG.3
(a)
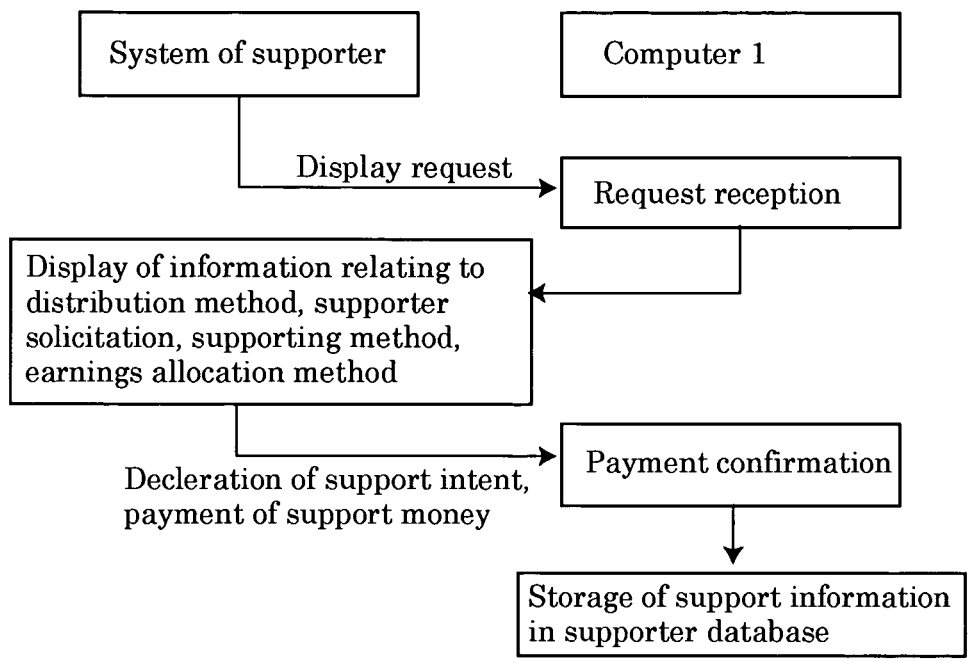
(b)
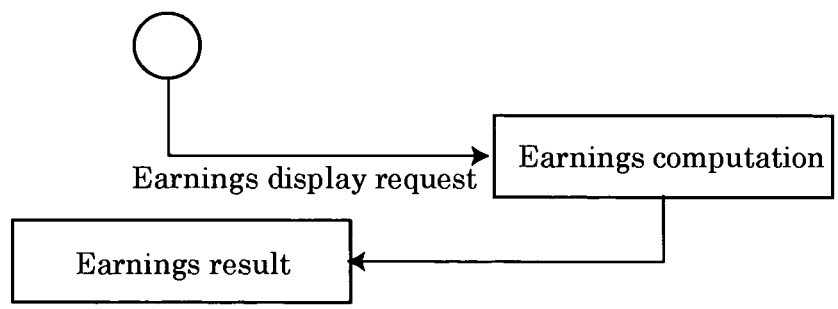

FIG.6

MUSIC PATRON CLUB
Artist Corner

The Music Patron Club invites all the artists who have the unpublished music and young and energetic artists who have various rights to the music. The Music Patron Club will serve as an agency executing the entire scope of marketing activity relating to all the rights associated with your music.

Click here for a guide to contract terms and conditions of artist registration. — 51a1  52a

| Artist registration form | |
|---|---|
| Group name | |
| Name of representative | |
| Mail address of representative | |
| Telephone of representative | |
| Location of representative | |
| Name of guardian for minors | |
| Contact with guardian for minors | |
| Contact items | |

51a2

Send Button
Once the aforesaid items have been completed, please, click once on the Send Button (please, wait several seconds for the reception confirmation comment to be returned from the server)

MUSIC PATRON CLUB

Music Reference (Audition) Corner

All the music registered in the Music Patron Club is referenced (auditioned) by the reference (audition) service in this corner. Please, search and audition the favorite music based on the artist name or music genre. If you liked the music that you have auditioned, please, feel free to download it in the music salon.

| Favorite musical genre | |
|---|---|
| Favorite artist | |
| Click here when advancing into the corner for auditioning the selected music. | |

51b1          52b

40

(b)

Music Reference (Audition) corner

●● Genre music table          51b5          51b6

| | If you liked the music that you have auditioned, please, feel free to download it in the music salon | | | | |
|---|---|---|---|---|---|
| Music name | Artist introduction and recent state | Patron state (chart button) | Audition count (chart button) | Fan chat room | Audition room |
| Music 1 | Artist guide button | Number of patrons | Count number | Artist fan button | Audition button |
| Music 2 | Artist guide button | Number of patrons | Count number | Artist fan button | Audition button |
| Music 3 | Artist guide button | Number of patrons | Count number | Artist fan button | Audition button |

MUSIC PATRON CLUB

Music Salon (Download) Corner

All the music registered in the Music Patron Club is downloaded by the download service in this corner. After advancing the favorite artist or musical genre into the salon, please feel free to download it according to the guidelines and enjoy the music.

| Favorite musical genre | 52c |
|---|---|
| Favorite artist | |
| Click here when advancing into the corner for downloading the selected music. 51c1 | |

(b)

Music Salon (Download)

●● Genre music salon

| | Please, push the download button of your favorite music and follow the guidelines. | | | | |
|---|---|---|---|---|---|
| Music name | Artist introduction and recent state | Patron state (chart button) | Download count (chart button) | Fan chat room | Download room |
| Music 1 | Artist guide button | Number of patrons | Count number | Artist fan button | Download button |
| Music 2 | Artist guide button | Number of patrons | Count number | Artist fan button | Download button |
| Music 3 | Artist guide button | Number of patrons | Count number | Artist fan button | Download button |

```
        ARTIST INTRODUCTION AND
        RECENT STATE GUIDE CORNER

1. Profile of ●●

General profile

2. Performance guide for ●●

Contents of registered music

3. Activity record of ●●

Artist recommends himself (herself)
```

MUSIC PATRON CLUB

Patron solicitation corner

In the Music Patron Club you may become a patron of music the rights for which belong to the artists that are the members of the Club. If you wish to become a patron, you can receive a share of all the earnings generated by this music.

Click here for a guide to contract terms and conditions for a patron. — 51d1

| Patron registration form | |
|---|---|
| Your name | |
| Age | |
| Gender | |
| Mail address | |
| Telephone | |
| Location | |
| Name of guardian for minors | |
| Contact with guardian for minors | |
| Object music | |
| Contribution | |
| Contact items | — 52d |

51d2

Send Button
Once the aforesaid items have been completed,
please, click once on the Send Button
(please, wait several seconds for the reception confirmation
comment to be returned from the server)

PATRON STATE RECOGNITION CORNER

Click here to see a patron earnings state — 51e1

52e

| Please, input ID | |
|---|---|
| Please, input your password | |
| Click here to see your patron special page | |

51e2

40

(b)

PATRON SPECIAL PAGE

● ● ● ● (Name)   Your (person who became a patron) state

| ● ● ● ● (Name)'s total earnings estimation | | | |
|---|---|---|---|
| Right earnings classification | Earnings of copyright segment 1 | Earnings of copyright segment 2 | Total of earnings estimation |
| Total earnings sum accumulation | Yen | Yen | Yen |
| ● (month) | Yen | Yen | Yen |
| ● (month) | Yen | Yen | Yen |

| Breakdown of music 1 (your share right ratio in● ●%) | | | |
|---|---|---|---|
| Right earnings classification | Earnings of copyright segment 1 | Earnings of copyright segment 2 | Total of earnings estimation |
| Total earnings sum accumulation | Yen | Yen | Yen |
| ● (month) | Yen | Yen | Yen |
| ● (month) | Yen | Yen | Yen |

43a

| Breakdown of music 2 (your share right ratio in● ●%) | | | |
|---|---|---|---|
| Right earnings classification | Earnings of copyright segment 1 | Earnings of copyright segment 2 | Total of earnings estimation |
| Total earnings sum accumulation | Yen | Yen | Yen |
| (month) | Yen | Yen | Yen |
| (month) | Yen | Yen | Yen |

| Please, input ID | ☐ 52f |
| --- | --- |
| Please, input your password | ☐ |
| Click here to see your artist special page | |

51f1                                                                   40

(b)

ARTIST SPECIAL PAGE

●●●● (Name)  Your state

| ●●●● (Name)'s total earnings estimation | | | | |
| --- | --- | --- | --- | --- |
| Right earnings classification | Patron acquisition distribution sum | Earnings of copyright segment 1 | Earnings of copyright segment 2 | Total of earnings estimation |
| Total earnings sum accumulation | Yen | Yen | Yen | Yen |
| ● (month) | Yen | Yen | Yen | Yen |
| ● (month) | Yen | Yen | Yen | Yen |

| Breakdown of music 1 | | | | |
| --- | --- | --- | --- | --- |
| Right earnings classification | Patron acquisition distribution sum | Earnings of copyright segment 1 | Earnings of copyright segment 2 | Total of earnings estimation |
| Total earnings sum accumulation | Yen | Yen | Yen | Yen |
| ● (month) | Yen | Yen | Yen | Yen |
| ● (month) | Yen | Yen | Yen | Yen |

| Breakdown of music 2 | | | | |
| --- | --- | --- | --- | --- |
| Right earnings classification | Patron acquisition distribution sum | Earnings of copyright segment 1 | Earnings of copyright segment 2 | Total of earnings estimation |
| Total earnings sum accumulation | Yen | Yen | Yen | Yen |
| ● (month) | Yen | Yen | Yen | Yen |
| ● (month) | Yen | Yen | Yen | Yen |

43b

40

METHOD AND SYSTEM FOR DISTRIBUTING INTELLIGENT CONTENT

FIELD OF THE INVENTION

The present invention relates to an intellectual contents distribution method, distribution system and distribution program. More specifically, the present invention relates to a distribution method, a distribution system and a distribution program for distributing intellectual contents such as music, musical performances, movies, art, literature, comics, computer software, and the like, from a computer via a network.

BACKGROUND OF THE INVENTION

Heretofore, musical performances (instrumental and vocal) have been marketed in the form of records or compact disks (CD), movies have been marketed in the form of video tapes, art or literature such as comics, cartoons, novels, and the like have been marketed in the form of publications, and computer software has been marketed in the form of software packages.

Musical performances marketed in the form of a CD will be explained hereinbelow as an example. In the explanation given hereinbelow "a copyright holder" and "a neighboring right holder" are the terms employed in the Copyright Act of Japan. In other countries, the meaning of those terms can be interpreted based on the Copyright Laws of those countries.

Because a huge cost is associated with the manufacture and circulation of CDs, the earnings received by the composer or songwriter who are the copyright holders or by the performer who is a neighboring right holder assume a tiny fraction of the total cost of sold CDs. Furthermore, in recent years, if a performance was given by a small group of performers, the performance recording could be conducted by the performers themselves in a simple manner, without using a studio, recording equipment, and recording engineers of special recording companies, and though such a recording was sold as is, in most cases the recording could be good enough for listening. However, when such recordings were carried into a circulation channel as the usual CDs, the earnings of the recording entity (a record manufacturer per Copyright Law of Japan), copyright holders, and performers may be very small.

For example, regarding musical performances, a music distribution method has recently been suggested, this method comprises the steps of converting a musical performance into digital information and distributing it to a system of a purchaser via the internet. With such a method, a musical performance is converted into digital information, the digitalized musical performance is stored on a server connected to a network representing the internet, and the digitalized musical performance is then transmitted to the system of the purchaser from the server via the network. The purchaser can reproduce and appreciate the musical performance in their system. Publications can be similarly distributed via a network in the form of electronic publications. Computer software has been regularly distributed via networks. Though movies that have been circulated as video tapes have a very large volume of information, the increase in network speed and improvement of information compression technology gradually make it possible to distribute the movies via the networks.

In the case of a performance recorded by the copyright holder or performer and a recording entity associated therewith, the recording can be converted into a digital format and loaded in the form of web pages on a web server connected to the internet. The web pages as referred to herein may be web pages operated by the recording entities themselves or web pages operated by the administrators managing the music distribution. A purchaser wishing to purchase the music downloads the music converted into a digital format from the web page into their system and pays a compensation therefor. When web pages are used that are operated by the recording entities themselves, the received payment can be allocated to the copyright holder, performer and recording entities. When web pages are used that are operated by the administrators managing the music distribution, part of the payment can be also allocated to the administrators. In both cases, the cost of managing the web page is quite small by comparison with the manufacture and circulation of CDs. Therefore, the share of earnings received by intellectual contents providers such as copyright holders, performers, and recording entities is much higher than that obtained from circulation of CDs, and the share of earnings can be increased even if the sale price is reduced.

As described hereinabove, employing a method for distributing the digitalized intellectual contents (recorded musical performances, copies of art, literature, comics, cartoons, recorded images such as movies, computer software, and the like) makes it possible to sell the products at a very low circulation cost.

However, the essence and specific features of the intellectual contents cannot be made known to the general public by merely uploading the intellectual contents converted into a digital form in a web page. The frequency at which the public accesses the web page can be increased by registering in a widely-known internet search system. However, it is difficult to arouse a sufficient purchasing interest by only public advertisement loaded on a web page. Moreover, when proceeds from sales from a web page only serve as a revenue source, sufficient revenues cannot be obtained before the intellectual contents become publicly known and the number of purchasers increases. For this reason, management of the distribution web page and actions of the intellectual contents providers such as copyright holders, performers, recording entities, and the like cannot be conducted smoothly.

SUMMARY OF THE INVENTION

It is an object of the present invention to provide an intellectual contents distribution method, distribution system, and distribution program that make it possible to inform the general public about the existence and specific features of the intellectual contents, to increase the number of sale events for the intellectual contents, and to ensure the operation and management of funds for the intellectual contents providers and distribution web page administrators within the required periods, while enjoying the merits of distributing the intellectual contents via a network.

The number of music lovers who are made happy by finding excellent performers or musical compositions among unknown performers (an artist such as a musician, singer, etc.) or musical compositions that have not yet become familiar to the wide public, finding unpublished musical compositions of famous performers, telling their own friends about the found unknown performers or unpublished musical compositions, and eventually letting the wide public know about the performers or musical composition famous has been growing. Further, the number of means suitable for disseminating this information among friends has been growing and presently they include cellular phones, mail using cellular phones, electronic mail via personal computers and the like, a bulk mail method by which the same mail is sent to a large number of people, advertisement in a web page opened by the person disseminating the information, and the like. Such information is rapidly spread via the circle of friends. In the present specification those people who are made happy by spreading widely the intellectual contents such as musical compositions or unknown performers will be collectively referred to as "supporters".

In the past, the supporters were contended with disseminating widely an unknown musical composition by their own advertisement activity. However, the supporters are even more satisfied if there is a way to financially support the activity of the intellectual contents providers such as performers, and the like. The supporters will be even more satisfied if they obtain a financial return when their advertisement activity increases sales of the intellectual contents such as musical compositions and the like.

Therefore, a distribution method that takes full account of the above-described activity, state of mind, and satisfaction of the supporters, would be able to inform the general public about the existence and specific features of the intellectual contents, to increase the number of sale events for the intellectual contents, and to ensure the operation and management funds for the intellectual contents providers and distribution web page administrators within the required periods, while enjoying the merits of distributing the intellectual contents via a network.

The present invention is based on the above-described information and the essence thereof is described hereinbelow.

An intellectual contents distribution method for distributing the intellectual contents from a computer via a network, wherein a contents 6 provided from a contents provider is stored in a computer 1, support results from one, two, or more supporters relating to the contents 6 are stored in the computer, the contents 6 are transmitted to a system 5 of a purchaser via a network 2 in response to the purchaser's request, purchase results of the contents 6 are stored in the computer 1, and the earnings to be returned to the contents provider and the earnings to be returned to each supporter are computed with the computer 1 based on a predetermined computational formula by using the support results and purchase results stored in the computer 1.

The intellectual contents distribution method as described hereinabove, wherein the actual current earnings that have to be received by the contents provider or each supporter are transmitted from the computer 1 via the network 2 to systems (3, 4) of the contents provider or each supporter, in response to the request from the contents provider or each supporter.

The intellectual contents distribution method as described hereinabove, wherein the contents provider and each supporter are assigned with personal identification information and the transmission of information relating to the contents provider and each supporter is conducted when the personal identification information has been received from the systems (3, 4) of the contents provider or each supporter via the network 2.

The intellectual contents distribution method as described hereinabove, wherein information on the present method for distributing the intellectual contents 6 via the network 2, information to the effect that the provision of the contents has been solicited, information relating to the method for support employed by the supporter, and information on the earnings that have to be received by the contents provider in response to the support results and sale results are transmitted in response to a request from an unspecified person to the system of the unspecified person.

The intellectual contents distribution method as described hereinabove, wherein information on the present method for distributing the intellectual contents via the network, information to the effect that a supporter has been solicited with respect to the contents provided from the contents provider, information relating to the method for support employed by the supporter, and information on the earnings that have to be received by the supporter in response to the support results and sale results of the contents are transmitted in response to a request from an unspecified person to the system of the unspecified person.

The intellectual contents distribution method as described hereinabove, wherein information on the contents that has been stored, information to the effect that these contents can be received via the network, and information to the effect that these contents can be purchased are transmitted in response to a request from an unspecified person to the system of the unspecified person.

The intellectual contents distribution method as described hereinabove, wherein information on the stored contents comprises information provided by the contents provider and this information provided by the contents provider can be freely updated in response to the access by the contents provider to the computer 1 via the network.

The intellectual contents distribution method as described hereinabove, wherein part of the contents or the entirety of the contents is transmitted to the system of the purchaser via the network in response to the request from the purchaser, irrespective of whether the declaration of purchase intent by the purchaser is present or not, and the declaration of purchase intent by the purchaser is received thereafter.

The intellectual contents distribution method as described hereinabove, wherein personal identification information is assigned to a purchaser in response to a request from the purchaser and the computer 1 can identify the purchaser by the personal identification information after the assignment.

An intellectual contents distribution system for distributing the intellectual contents from a computer via a network, wherein the system comprises connection means or unit 11 for connecting a system 3 of a content provider, a system 4 of a supporter, and a system 5 of a purchaser via a network, and further comprises a contents database 13 storing the contents 6 provided from the contents provider, a supporter database 14 for storing the support results from one, two or more supporters corresponding to the contents, a purchase database 15 for storing the contents purchase results, and earnings computation means 12, the contents 6 stored in the contents database 13 is are transmitted to the system 5 of the purchaser via the network 2 in response to a request from the purchaser, and earnings which are to be returned to the contents provider and earnings which are to be returned to each supporter are computed with earnings computation means by using the support results stored in the supporter database 14 and purchase results stored in the purchase database 15.

The intellectual contents distribution system as described hereinabove, wherein the actual current earnings that have to be received by the contents provider or each supporter are computed with earnings computation means 12 in response to the request from the contents provider or each supporter and the computation results are transmitted from connection means 11 to the system of contents provider or each supporter via the network.

The intellectual contents distribution system as described hereinabove, wherein information of one, two, or more types selected from information on the present system for distributing the intellectual contents via the network, information to the effect that the provision of the contents has been solicited, information relating to the method for support employed by the supporter, information on the earnings that have to be received by the contents provider or supporter in response to the support results and sale results, information to the effect that a supporter has been solicited with respect to the contents provided from the contents provider, information on the stored contents, information to the effect that the contents can be received via the network, and information to the effect that the contents can be purchased is transmitted in response to a request from an unspecified person from connection means 11 to the system of the unspecified person via the network.

The intellectual contents distribution system as described hereinabove, wherein information on the stored contents comprises information provided by the contents provider and this information provided by the contents provider can be freely updated in response to the access by the contents provider to the computer system via the network.

The intellectual contents distribution system as described hereinabove, wherein part of the contents or the entirety of the contents is transmitted to the system of the purchaser via the network in response to the request from the purchaser, irrespective of whether the declaration of purchase intent by the purchaser is present or not, and the declaration of purchase intent by the purchaser is received thereafter.

An intellectual contents distribution program for causing a computer to function as the intellectual contents distribution system as described hereinabove.

A computer readable storage medium having recorded therein the intellectual contents distribution program described hereinabove.

In accordance with the present invention, the intellectual contents mean recordings of musical performances, publications such as literature, scientific publications, art, comics, continuous recordings of images such as movies and the like, and computer software, databases, and the like.

In accordance with the present invention, the intellectual contents are provided by a "contents provider". Copyright and neighboring right specified by a Copyright Act are usually associated with the intellectual contents. Therefore, the contents provider predetermines the entities having a title to the right of reproduction or transmission possibility right also specified by the Copyright Act in relation to the copyright and neighboring right for the contents, or agents or representatives thereof. Furthermore, in accordance with the present invention, when the intellectual contents are distributed, the attribution of rights based on the copyrights and neighboring rights between the contents provider, distribution system administrator, and supporter have to be determined by agreement between the parties. The explanation provided above is based on the language specified by the Copyright Act of Japan. In other countries, the interpretation should be based on the copyright acts of those countries.

The "administrator" of the distribution method and distribution system in accordance with the present invention prepares the distribution system, receives the intellectual contents from the contents provider, solicits the supporter, receives support from the supporter, allocates the support to the contents provider and administrator, distributes the intellectual contents to a purchaser, collects purchase cost, and allocates the purchase cost to the contents provider, administrator, and supporter. For the administrator to implement the above-described operations, a contract should be prepared and signed by the contents provider, supporter, and administrator.

In accordance with the present invention, the supporter is an entity responding to the solicitation made by the administrator. An entity usually becomes a supporter by providing the prescribed support sum. It goes without saying that the supporter can substitute a promise to advertise the contents widely to the public for the support sum, according to a contract with the administrator. The supporter receives the purchase cost allocated thereto according to the original contract, once the contents have been purchased. The supporter usually conducts the advertisement activity by its own efforts and means with the object of expanding the sale of the contents.

FIG. 1 is a block diagram illustrating schematically the entire distribution system in accordance with the present invention;

FIGS. 2(a) and (b) are flow charts illustrating the flow of information between the computer and the system of a contents provider in accordance with the present invention;

FIGS. 3(a) and (b) are flow charts illustrating the flow of information between the computer and the system of a supporter in accordance with the present invention;

FIG. 6 shows a browser display screen for soliciting the contents provider in accordance with the present invention;

Figure 1:
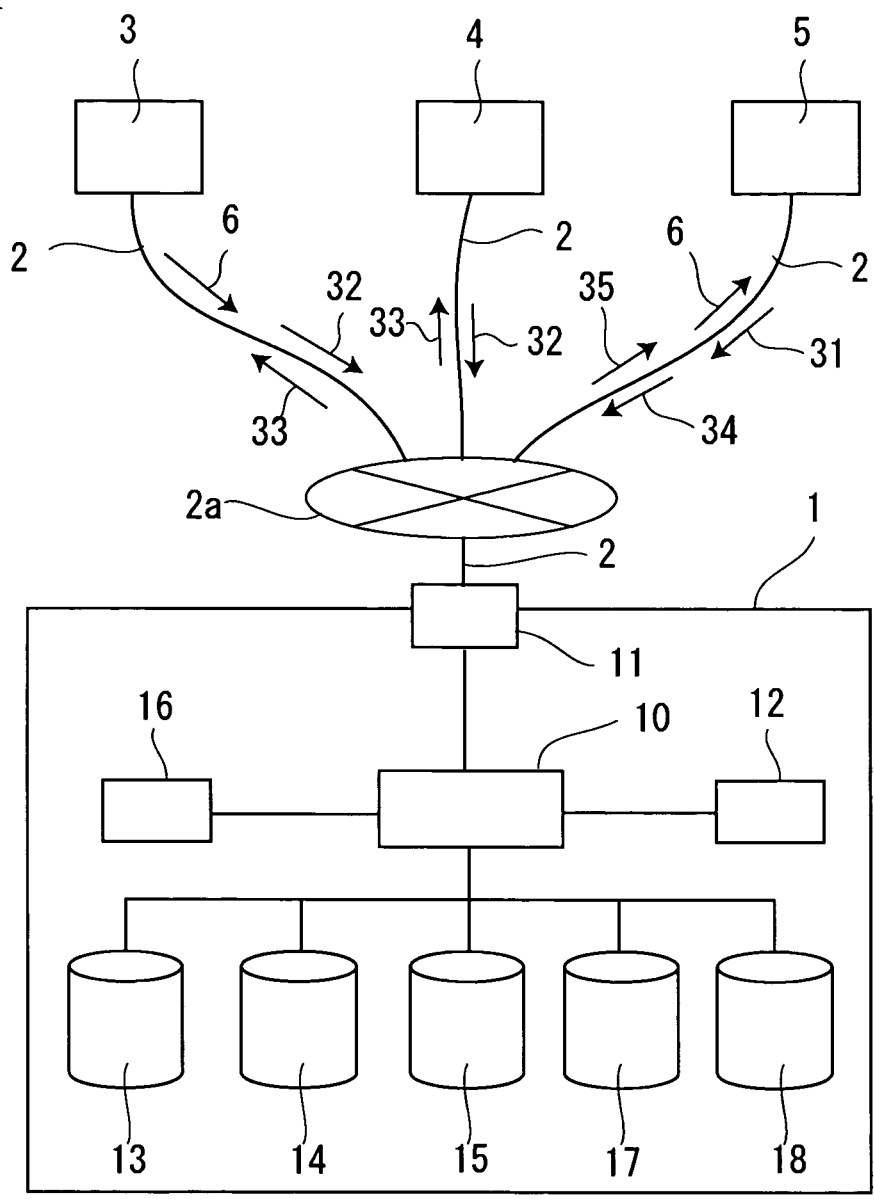

FIGS. 7(a) and (b) show browser display screens for requesting the audition of the contents in accordance with the present invention;

FIGS. 8(a) and (b) show browser display screens for requesting the download of the contents in accordance with the present invention;

FIG. 9 shows a browser display screen displaying the information about the artist in accordance with the present invention;

FIG. 10 shows a browser display screen for soliciting a supporter in accordance with the present invention;

FIGS. 11(a) and (b) show browser display screens displaying the earnings results for the supporter in accordance with the present invention; and FIGS. 12(a) and (b) show browser display screens displaying the earnings results for the contents provider in accordance with the present invention.

DETAILED DESCRIPTION OF THE INVENTION

The preferred embodiment of the present invention will be described hereinbelow based on the block-diagram shown in FIG. 1 and flow charts shown in FIGS. 2(a)-4.

When the intellectual contents are a music performance, the melody is performed by a performer such as a musician or a singer. This performance is recorded by a recording entity. When the performance is made by a small number of people, the recording can be conducted in a comparatively simple manner without a special recording studio or expensive recording equipment. The recording can be made even easier if a sequencer is used as the musical instrument. The contents of the recording are recorded on magnetic tapes such as cassette tapes, DAT, and the like, compacts disks (CD), mini disks (MD), and the like. The recorded information can be read by a computer, converted to the prescribed format, and stored as digital information on a memory device, such as a hard disk inside the computer. Significant progress has been observed in recent years in recording compression technology. As a result, the original data can be compressed to 1/10 or even less thereof. Further, in order to prevent so-called illegal copying, that is, reproduction prohibited by the Copyright Act, electronic marks are introduced or a format is employed which limits the number of copies.

When the intellectual contents are in the form of literary works of literature, science, art or comics, if the literary work is a printed product, it can be read with a scanner or digital camera and converted into digital information, or if it is already presented in the form of digital information, it can be directly read by a computer, optionally subjected to compression, and stored in the storage unit such as a hard disk in the computer.

When the intellectual contents are a movie consisting of a continuous sequence of images, those images are usually recorded on a video tape or film. Therefore, the movie can be read by a computer, subjected to compression, and stored in a memory unit such as a hard disk in the computer.

The role allocation between the contents provider and distribution system administrator is usually such that the initial audio recording, video recording, or recording on paper is conducted by the contents provider. Compression and conversion of this initial video or audio information into distributable digital information is usually conducted by either the contents provider or the distribution system administrator.

The following method can be employed for providing the contents from the contents provider. For example, in the case of audio recordings of musical performances, the MD medium having the contents recorded thereon is provided from the contents provider to the administrator, and the contents are stored in the administrator's system based on the MD. It is most preferred that a mode shown in FIG. 1 be used in which the system 3 of the contents provider and a computer 1 of the administrator are connected via a network 2 and contents 6 stored in the system 3 of the contents provider are transmitted to the computer 1 of the administrator via the network 2.

The contents 6 are stored in a contents database 13 in the computer 1 of the administrator and are placed in a state in which they can be transmitted to a system 5 of a purchaser via the network 2 in response to a request from the purchaser. A person desiring to make a purchase accesses the web page of the administrator from its own system via the internet and verifies the presence of the contents that he/she wants to purchase. As for the purchase request from the purchaser, in the most common mode, the input from the system 5 of the purchaser is transmitted via the network 2 and the prescribed input is made in the web page of the administrator. If necessary, the prescribed compensation payment or promise thereof is made. The contents 6 are transmitted via the network 2 to the system 5 of the purchaser in response to the request from the purchaser as disclosed above in accordance with the present invention. If the purchase contract is made, the purchase results relating to the contents are stored in a purchase database 15 in the computer 1 of the administrator.

Issues relating to supporters representing a feature of the present invention will be explained below.

The administrator who received the contents from the contents provider makes a plan with respect to a total support sum to be received from supporters based on the estimated sale price and sale estimates. The support sum authorized by the supporters is basically split between the contents provider and administrator and becomes the operation fund and initial profit of the contents provider and administrator. Solicitation of supporters can be conducted by a method comprising the steps of dividing the support sum, for example, in N parts, considering each of N support sums as 1 share, and soliciting the supporters by considering 1 share as a minimum support amount. It goes without saying that the supporters may be solicited without determining the total support sum, and splitting between the contents provider and administrator may be conducted based on the resulting total support sum.

The administrator then determines how the proceeds of sales are to be split between the three entities (contents provider, administrator, and supporters) as a result of contents sale and an agreement on this matter is reached between the contents provider, administrator, and supporters.

The administrator can determine in advance the approach to the above-described support system and the issue of sharing the support money and proceeds of sales and describe it in the administrator's web page.

As a result, information on the method for distributing the intellectual contents via the network, information to the effect that the contents provision has been requested, information relating to the method for support by the supporters, information on earnings that are to be received by the contents provider according to the support results and sale results, and other important information on the above-described method can be transmitted to the system of an unspecified person via the network in response to the request from the unspecified person reading the web page of the administrator. As a result, the above-mentioned information can be displayed on the system of the unspecified person. The unspecified persons include the holders of the intellectual contents. If the contents holder reading the information provides the contents to the distribution system of the administrator, the allocation of support sum can be initially received, the advertisement activity of the supporters can be anticipated, sales of the intellectual contents thereof can be increased, and what portion of the proceeds of sales can be received as earnings can be determined. As a result, the administrator can receive the provision of a plurality of types of high-quality intellectual contents from a plurality of contents providers. The flow chart of this process is shown in FIG. 2.

Once the administrator has received the intellectual contents from the contents provider, the specific method for soliciting the supporters is studied in the above-described manner and solicitation of the supporters is initiated. The details relating to the intellectual contents and solicitation of supporters can be described in the web page of the administrator. Thus, information on the method for distributing the intellectual contents via the network, information to the effect that supporters have been solicited with respect to the contents that has been provided by the contents provider, information relating to the method for support by the supporters, information on earnings that are to be received by the contents provider according to the support results and sale results, and other important information on the above-described method can be transmitted to the system of an unspecified person via the network in response to the request from the unspecified person reading the web page of the administrator and, as a result, the above-mentioned information can be displayed on the system of the unspecified person. The unspecified persons include those who desire to provide support. The support candidates become aware that by sending a specified support sum or providing the specified support upon confirming the details of the contents, they can receive part of the proceeds of sales as earnings, following the sale of the contents. As described above, for example, if the contents are music, because among the music lovers there are many people who enjoy finding an unknown artist and bringing the artist up, those music lovers can be gained as supporters. Data relating to the supporter subscription state and support money supply state are stored in the supporter database in the computer 1 of the administrator. The flow chart of this process is shown in FIG. 3(a).

If the contents provider wishes to know how the supporters are solicited for the provided contents, how successful the sale of the contents is, and how large the sum of the earnings that is to be received by the contents provider is and can immediately get the answers to his questions, then the contents provider will be comfortable with and will rely on the system in accordance with the present invention. Similarly, if the supporter wishes to know the current state of sales and the amount of earnings which are to be obtained with respect to the contents that are supported by the supporter and can immediately get the answers to his questions, then the supporter will feel easy with and will rely on the system in accordance with the present invention. The results of support provided by the supporter for the contents can be stored in the computer, the purchase results for the contents can be stored in the computer at the same time, and the earnings which are to be returned to the contents provider and the earnings which are to be returned to each supporter can be calculated by employing means for calculating earnings which is incorporated in the computer, based on the predetermined calculation formulas by using the aforesaid support results and purchase results stored in the computer. Obviously, the earnings which are to be returned to the administrator can be also calculated. Because the earnings which are to be returned to the contents provider and earnings which are to be returned to each supporter can be calculated and reported at the prescribed time or upon request, the contents provider and supporters can safely entrust the administration of contents distribution to the administrator.

Inquiries from the contents provider and supporters, which relate to the earnings, can be received via phone or fax and answers thereto can be sent also via phone or fax after the administrator calculates the earnings results with the computer. However, it is preferred that the current earnings that are due to the contents provider or each supporter are preferably transmitted to the systems of the contents provider or each supporter from the computer 1 via the network 2 in response to the request from the contents provider or each supporter. The systems of the contents provider and the supporters are connected to the computer of the administrator via the network and the contents provider and supporters input requests concerning the current earnings which are to be obtained thereby. The computer of the administrator can immediately transmit the results obtained in calculating the earnings on a fixed periodic basis, or the results obtained in calculating the earnings in response to the question to the system of the entity requesting the information via the network. Usually, the information sent to the system of the entity requesting the information is displayed as a web page on the browser of the system of the entity requesting the information. The flow chart of the process is shown in FIG. 2(*b*) and FIG. 3(*b*).

When the computer of the administrator receives the request to provide information from the contents provider or supporter via the network, the computer of the administrator cannot send a response unless it has confirmed that the entity requesting the information is indeed the contents provider or supporter. It is preferred that the contents provider and each supporter be assigned with personal identification information and the information relating to the contents provider and each supporter be transmitted when the personal identification information is received via the network from the contents provider and each supporter. In such a case, each person can be identified with high reliability. The aforesaid personal identification information is usually a combination of a password and an ID code indicating each person. The password is known only to the person, the administrator, and the computer thereof, and usually can be changed by the person. Each person is identified by transmitting the ID code and password from the person's system in response to the request from the computer of the administrator. The transmitted information as referred to herein represents the amount of earnings which is to be received by the contents provider or supporter and other information.

The information held by the administrator may be preferentially provided to the contents provider or supporter assigned with the personal identification information. For example, if information relating to the details of newly provided contents is preferentially supplied to the contents provider and supporters, there is a high probability of them becoming the supporters of the novel contents. As for means for preferentially providing the information, it is possible to expand the range of information that can be provided when the computer of the administrator is accessed by a person having a personal identification information assigned thereto, or to provide the information in the form of periodic or random electronic mail to a person having a personal identification information assigned thereto. Yet another option is to provide such persons with a right to view the contents even without displaying the purchase intent.

The contents are stored in the computer of the administrator in a state in which it can be transmitted to the system of the purchaser via the network in response to the request from the purchaser. A person wishing to make a purchase accesses the web page of the administrator from his/her own system via the internet and confirms the presence of the contents that he/she wishes to purchase. The computer of the administrator is in a state in which it can transmit information relating to the contents stored in the computer, information to the effect that the contents can be received via the network, and information to the effect that the contents can be purchased to the system of an unspecified person via the network in response to the request from the unspecified person. More specifically, the computer of the administrator can perform a web server function, the display request can be made by an unspecified person accessing the web page opened on the web server, the information can be transmitted via the network to the system of the unspecified person, and this information can be displayed on the system of the unspecified person. The unspecified persons include those who wish to purchase the contents. Those who wish to make a purchase can determine the contents which are to be purchased, upon referring to the received information.

As described hereinabove, the web page opened by the administrator serves as an advertisement of the contents. It goes without saying that the information on the web page relating to the contents stored in the computer can display the advertisement initially provided by the contents provider and the advertisement conceived by the administrator. Further, it is preferred that the information on the stored contents contain the information that is supplied by the contents provider and can be freely updated by the contents provider via the network in response to the access to the computer. For example, if an electronic bulletin board is provided for each of the contents or each artist on the web page and if the system is such that the person accessing the web page, more specifically, the person wishing to make a purchase or a supporter can freely express his/her view or give his/her thoughts on the contents and the contents provider can write his/her comments in regard to those impressions or thoughts, then the fan and the artist can directly communicate via the electronic bulletin board. Such a dialog effectively increases the number of fans of this particular artist and makes a significant contribution to the increase in sales of the contents.

As for the method by which the purchaser can make a purchase request, in a most typical situation, the input from the system of the purchaser is transmitted via the network and the prescribed input is made to the web page of the administrator. If necessary, the prescribed compensation payment or a promise of compensation payment can be made.

As for the relationship between the purchase compensation payment from the purchaser and the transmission of contents, the following methods can be employed: (a) the contents are transmitted after the compensation payment or a promise thereof; (b) initially, only a part of the contents is transmitted and then the entire contents are transmitted after the compensation payment or a promise thereof; (c) the entire contents are transmitted prior to compensation payment and the compensation payment is received ex post facto from the selected purchasers.

Figure 4:
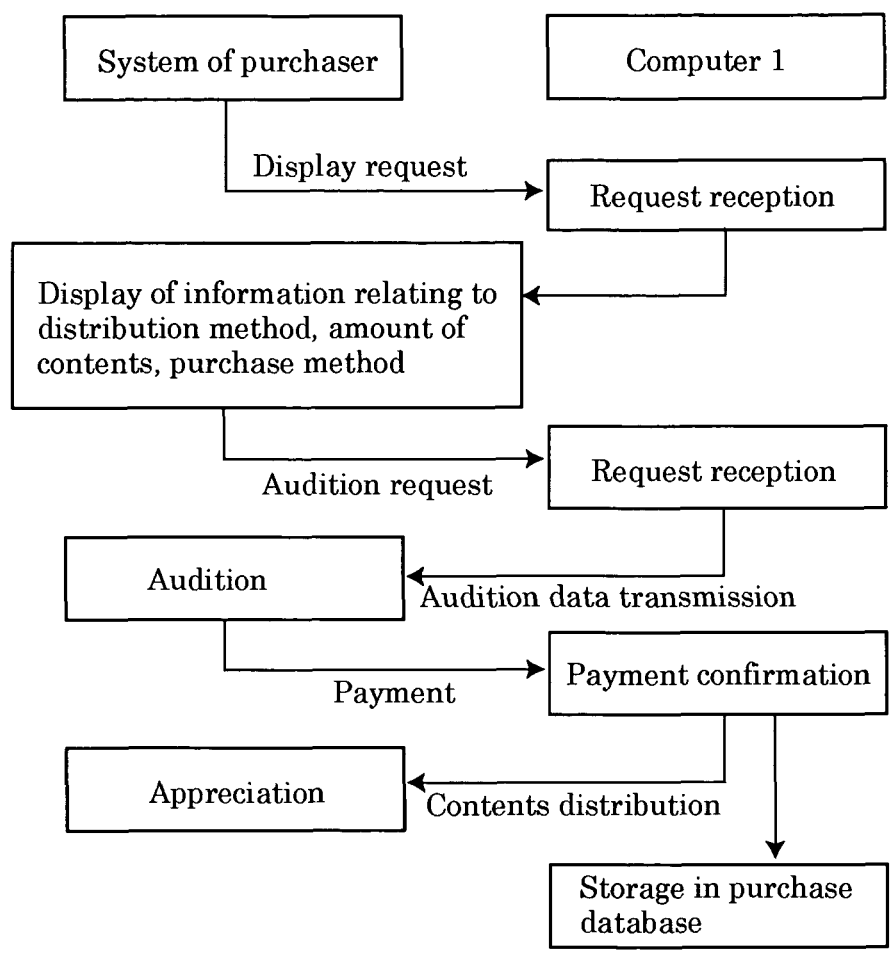
FIG. 4 is a flow chart illustrating the flow of information between the computer and the system of a purchaser in accordance with the present invention.

The above-described methods (b) and (c) correspond to the method by which a part of the contents or the entire contents are transmitted to the purchaser's system via the network in response to the request from the purchaser, regardless of the presence of the declaration of purchase intent from the purchaser, and the purchase intent display from the purchaser is received thereafter. For example, if the contents are a musical recording, according to method (b), the purchaser may listen only to part of the melody, or according to method (c), the purchaser may listen to the entire melody and may display the intent of making the compensation payment only if he/she wishes to make a purchase. Because the purchaser can make a compensation payment after checking all the details, the purchaser can feel himself at ease. The flow chart for the case corresponding to the above-described method (b) is shown in FIG. 4.

A transfer from a bank account or a convenience store can be used by the purchaser to make the compensation payment for the purchase. Alternatively, the account can be settled by using a credit card, debit card, or PAYPAL. Settling the account with a credit card is preferred because it does not require a trip to the bank or convenience store to make a payment. However, if the card number is sent via a network, the risk of the card number being stolen cannot be ignored. If a personal identification information is assigned to the purchaser in response to the request by the purchaser, the computer can identify the purchaser based on the personal identification information after it has been assigned to the purchaser and it becomes unnecessary to input the credit card number each time a purchase is made. As for the personal identification information, the electronic mail address of the person can be used as the ID code and the password can be issued by the system of the administrator.

For example, when the intellectual contents are a musical performance, the purchaser usually purchases the intellectual contents with the object of appreciating the music individually. In such a case, the purchase price for the intellectual contents is obviously low. However, in accordance with the present invention, the object of purchasing an individual contents by a purchaser is not limited to such an individual use. For example, the purchaser may be a broadcasting corporation purchasing a musical performance for subsequent broadcasting, or the purchase can be made for reproducing the musical performance in places where a large number of people are present. In such a case, the purchase price is higher than in the above-described case of individual use. It goes without saying that a mutual agreement has to be reached in advance between the contents provider, administrator, and supporters with respect to such issues as to whether the distribution of intellectual contents for such non-individual use is to be allowed, how high the price should be, and how the proceeds of sales should be distributed.

The computer 1 administered by the administrator as shown in FIG. 1 is a central unit in accordance with the present invention. A usual personal computer or a workstation can be advantageously used as the computer 1. It goes without saying that an office computer or a mainframe may be also used. Further, a machine having an incorporated microcomputer chip may be also used.

The computer 1 comprises a central processing unit 10, and a variety of necessary processing operations are conducted according to the program installed therein. The computer 1 has connecting means or unit 11 for connection to the network 2 and can be connected via the network 2 to the system 5 of the purchaser, system 3 of the contents provider, and system 4 of supporters. Connection of the computer 1 to internet 2a is most typically made using a telecommunication circuit. As a result, the system 5 of the purchaser, the system 3 of the contents provider, and the system 4 of supporters can be connected to the computer 1 by connecting to internet 2a via the respective telecommunication circuit. A mode may be also employed in which the system 3 of the contents provider is directly connected to the computer 1, for example, via a telephone line, without using internet 2a. As for the connection means 11 of computer 1, if the telecommunication circuit connected to the computer is an analog telephone line, a modem is used; if the communication line is an ISDN line, a terminal adaptor or a remote router is used; and if the communication line is an ADSL line or CATV line, a modem is used.

The computer 1 is usually composed of a single computer. However, the functions of the present computer can be shared by no less than two computers, and no less than two computers can function separately. Further, no less than two computers may be installed in remote locations. For example, if only the contents database is held in the second computer, other functions are held in the first computer, and the purchase wish from a purchaser is received by the first computer, then a mode can be used in which the first computer sends a command to the second computer and the requested contents are sent to the system of the purchaser from the contents database of the second computer.

The system 5 of the purchaser, the system 3 of the contents provider, and the system 4 of supporters may be in the form of personal computers, workstations, mainframes, cellular phones, and the like. The software operating in the system 5 of the purchaser, the system 3 of the contents provider, and the system 4 of supporters can be a special software designed specifically for communication with the computer 1, but the browser software for the internet that is usually used can be also employed for this purpose. When the browser software is used, the computer 1 constitutes a web server and a variety of displays can be displayed via the browser software on the display of the purchaser system by referencing, for example, to the HTML text stored in the computer. Furthermore, when the browser software is used, programming means such CGI or JAVA® which are usually employed in the internet can be used.

The computer 1 comprises a contents database 13 storing the contents, a supporter database storing the support results from the supporters, and a purchase database 15 storing the contents of purchase results. The respective databases are arranged on the storage device such as a hard disk of computer 1. The contents database 13, supporter database 14, and purchase database 15 are preferably composed and stored on the storage device as individual files, but at least two of those databases may be also composed as a single file.

In the case of movies that consist of images, the amount of data is huge and memory units using a medium such as CD-ROM, CD-R, CD-RW, DVD, and the like can be used for the contents database 13. The contents database 13 stores the contents provided by the contents provider upon converting to digital information of the prescribed format. When a plurality of contents are stored and transmission to the systems of the purchaser is conducted via the network in response to the request from the purchaser, the appropriate contents are read out from the contents database under the control of the central processing unit of computer 1 and the read-out contents are transmitted via connection means 11 of computer 1.

The supporter database 14 stores the number of supporters, information identifying each supporter, support results relating to each supporter (sum and the like), and information on the earnings that have to be received by the supporter according to the contents sale results.

The transmission of information in response to the request made by the person wishing to make a purchase, establishment of the purchase contract, and actual payment of the price are recorded for each of the contents and each purchaser (person wishing to make a purchase) and the number of transmission events, the number of purchase contract establishment events, and the number of price payments for each of the contents are also recorded in the purchase database 15. As for the collection of payment, the user of the present invention can establish and use his/her own charge system, or the actual collection can be conducted by the system of major providers (internet connection service providers) in which the charge system has already been established, and actual reception of payments can be also recorded in the purchase database by receiving a payment event message from the major provider. In the case of confirming the transmission of contents for auditioning prior to establishing a purchase contract for the contents, information relating to the transmission of contents for auditioning may be stored in an auditioning database 17 separately from the aforesaid database 15. Combining data stored in the auditioning database 17 makes it possible to combine as a total and display the trends in popularity for each of the contents. It goes without saying that the contents auditioning results and purchasing results may be stored together in the purchase database 15 and the popularity trends for both auditioning and purchasing may be displayed for each of the contents.

The earnings obtained by deducting the necessary expenses from the sum of the support sum from the supporters and proceeds of the contents sales are distributed between the contents providers, administrator, and supporters. The earnings derived from the support sum from the supporters are distributed between the contents provider and administrator, and the earnings from the proceeds of the contents sales are distributed between the contents provider, administrator, and supporters. The distribution rule is agreed upon in advance by the parties, and the computation logic can be stored in the computer 1 in the form of an earnings computation table 16 for each of the contents.

Earnings computation means 12 can compute the amount of earnings that has to be actually received by the contents provider, administrator, and each supporter by referring to the earnings computation table 16, supporter database 14, and purchase database 15. Computation with earnings computation means 12 can be conducted automatically with the prescribed frequency, or the computation of earnings can be conducted each time it is requested by the contents provider or each supporter for the requested instant. The computation results are transmitted to the person who requested them.

Computing the earnings by using the earnings computation table 16 can be conducted, for example, in the manner as follows. An allocation ratio representing the amount that can be received by the contents provider and administrator from the support sum from the supporters is stored for each of the contents in the earnings computation table 16. Furthermore, another allocation ratio representing the amount that can be received by the contents provider, administrator, and each supporter from the proceeds of a contents sale is also stored for each contents in the earnings computation table 16. When a request for earnings computation is received from the contents provider, the earnings sum from the support sum is computed by applying the allocation ratio presented in the earnings computation table 16 to the total sum of support money that can be calculated from the supporter database 14 for each of the contents provided by the contents provider, the earnings sum from the purchase cost is computed by applying the allocation ratio presented in the earnings computation table 16 to the total sum of purchase sum that can be calculated from the purchase database 15, and the information on computed earnings are transmitted to the contents provider. When a request for earnings computation is received from a supporter, the earnings sum from the purchase cost is computed by applying the allocation ratio presented in the earnings computation table 16 to the total sum of purchase sum that can be calculated from the purchase database 15, and the information on computed earnings is transmitted to the supporter.

The computer is operated by the computer program. As described above, a program for distributing the intellectual contents is prepared for operating the computer 1 so that it functions as a system for distributing the intellectual contents, and operating the computer 1 according to this program allows the computer 1 to function as a system for distributing the intellectual contents.

As disclosed above, the program for distributing the intellectual contents in accordance with the present invention can be recorded on a computer-readable recording medium. The computer-readable recording medium is a recording medium such as flexible disks, MO, CD-ROM, CD-R, CD-RW, magnetic tape, and the like. If a computer program is recorded on such a recording medium and the program is read from the recording medium with any computer, this computer can be operated as the distribution system in accordance with the present invention.

In the explanation given hereinabove, the case was assumed in which the contents 6 were stored in the computer 1 of the administrator, the computer 1 of the administrator and the system 5 of the purchaser (person wishing to make a purchase) was connected by the network 2, and the computer 1 of the administrator conducted separate communication with each purchaser. On the other hand, if a new broadcasting medium such as digital TV is used, then the transmission of information from the administrator can be conducted in a batch mode in the form of broadcasting and a plurality of purchasers (persons wishing to make a purchase) can receive the information at the same time by viewing the television. Wireless distribution from communication-broadcasting satellites or ground stations, cable broadcasting using CATV, and the like can be considered as the medium for transmitting information. Further, in the case of digital TV, it is possible not only to obtain information in the form of broadcasting, but also to send information to the broadcasting station via a telecommunication circuit from the viewer's receiver. In this case, the transmission of information from the viewer becomes interactive. Means for transmitting information from the viewer can be provided in a digital TV receiver or digital tuner and the information can be transmitted by connecting the transmission means with the broadcasting station by a network. The usual telephone line or a CATV communication network in the case of broadcasting via CATV can be used as the network.

The present invention can be also used in such a digital TV broadcasting capable of conducting interactive communication. The contents distribution program is included in the broadcasting, the purchaser (person wishing to make a purchase) viewing the contents distribution program selects the purchase contents from the contents introduced by this program and transmits the purchase message from the transmission means of the purchaser connected to the broadcasting station. The broadcasting station that has received the purchase message transmits the contents to the purchaser. The TV broadcasting waves have a high transmission speed in a very wide area. Therefore, it is preferred that the TV broadcasting waves be used as the contents transmission means. However, because the TV broadcasting waves can be received by any viewer, the system should be such that the received contents can be used only by the purchaser and cannot be used by other persons. Such a provision is preferably incorporated as a function of the digital TV receiver or digital tuner.

The contents distribution program in such digital TV broadcasting is broadcasted via one of a vary large number of TV channels and a very large number of contents can be introduced within a limited broadcasting timeframe. Therefore, it is not easy to attract purchasers for distribution based on such a contents distribution program, unless effective advertisement is employed. In this respect, the activity of the supporters in accordance with the present invention becomes effective. The supporters of each of the contents can advertise the contents and, at the same time, can let their friends know the broadcasting station and broadcasting time for the contents distribution program by which the contents is distributed. As a result, a plurality of purchasers can be induced to view the contents distribution program.

Figure 5:
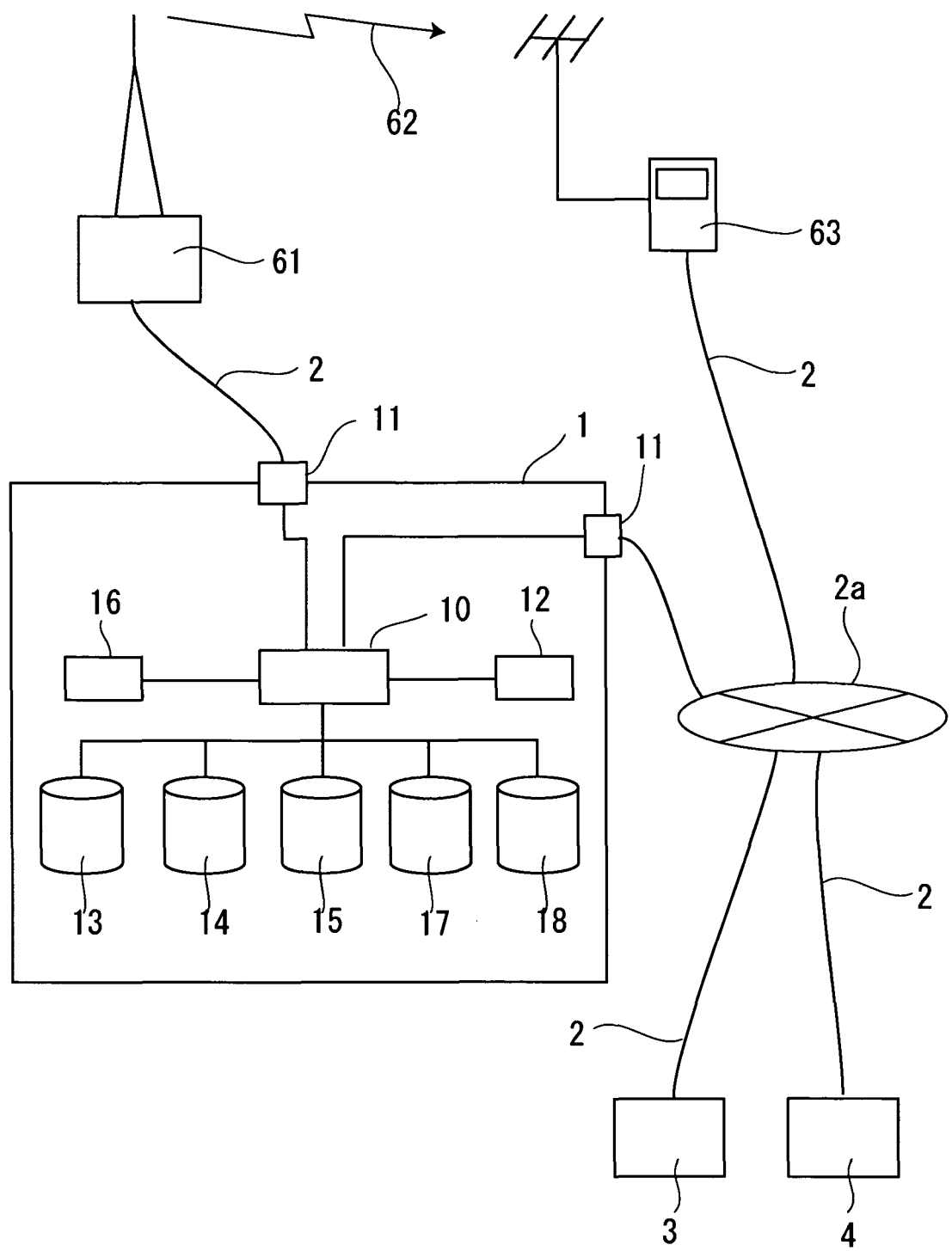
FIG. 5 is a block diagram illustrating schematically the entire distribution system in accordance with the present invention, which uses television broadcasting.

When the digital TV broadcasting is used for the present invention, the broadcasting station conducting the TV broadcasting most often becomes the administrator in accordance with the present invention. The block diagram relating to such a case is shown in FIG. 5. The relationship between the contents provider, administrator, and supporters is identical to that employed when the contents 6 is distributed form the computer 1 via the network 2. Storing the contents 6 in the computer 1 is unchanged. However, instead of distributing the contents 6 from the computer 1 via the network 2, the contents is are transmitted from the computer 1 to the TV broadcasting station 61 and then distributed from the TV broadcasting station 61 via the broadcasting transmission medium such as electromagnetic waves 62 or the like. Information of at least one type selected from information relating to the method for distributing the intellectual contents via the broadcasting transmission medium, information to the effect that the contents provision is solicited, information relating to the method of support by the supporters, information on the earnings which are to be received by the contents provider or supporters according to the support results and sales results, information to the effect that supporters are solicited for the contents that has been provided by the contents provider, information relating to the stored contents, information to the effect that the contents can be received via the broadcasting transmission medium, information to the effect that the contents can be purchased, and general information on other methods, is transmitted within the program from the TV broadcasting station 61 via the broadcasting transmission medium, instead of being transmitted to the system of an unspecified person via the network in response to the request from the unspecified person, and the viewer who has received the broadcasting can view this information via the TV receiver 63. The TV receiver 63 is usually connected to the TV broadcasting station 61 via the network 2 and finally to the computer 1.

Embodiments

An embodiment of the present invention will be explained hereinbelow based on the example in which a computer 1 managed by an administrator is connected to internet 2a and employed as a web server, and the computer 1 manages a music distribution club called a "Music Patron Club" for music distribution. The term "patron" is derived from a Japanese colloquialism meaning "a patron". A connection means 11 of the computer 1, a system 3 of a contents provider, a system 4 of supporters, and a system 5 of purchasers are connected by a network 2 shown in FIG. 1.

In the contents solicitation state, as shown in FIG. 2(a), if a display request is supplied to the computer 1 from the system of a contents holder (which is to be a contents provider), a browser screen 40 shown in FIG. 6 is displayed via a browser software on the display of the system of the person making the request. This information describes the purpose of the Music Patron Club. If a click button 51a1 on the screen is mouse clicked, contract terms and conditions guidelines for a contents provider are displayed. If the prescribed input is made in the input frame 52a in the contents solicitation display 41 and then the click button 51a2 is mouse clicked, the person is the registered as a contents provider in the computer 1 of the administrator. Upon registration, as shown in FIG. 1 and FIG. 2(a), the contents 6 are transmitted from the system 3 of the contents provider into the computer 1 via the network 2 according to the prescribed procedure.

Those who heard about the Music Patron Club and became interested, those who found the club by using an internet search system, those who already knew about the Music Patron Club and wanted to search the contents, and other people can connect to the web page of the Music Patron Club stored in the computer 1 by connecting their own system (referred to herein as a system 5 of a purchaser) to internet 2a and transmitting the address of the Music Patron Club. As for the page prepared for the person planning to make a purchase, as shown in FIG. 7(a), a browser screen 40 is displayed in which the Music Patron Club is introduced and where the person can proceed to an audition corner by inputting the desired music genre or artist name. The browser screen 40 shown in FIG. 7(b) can be displayed by inputting the prescribed information in the input frame 52b and then mouse clicking with the click button 51b. If the contents of interest is are present in the music table shown in FIG. 7(b), the entire data relating to the music or part thereof can be transmitted from the computer 1 to the purchaser system 5 and the music can be auditioned by the output from the purchaser system 5 by mouse clicking an audition button 51b4. If an author guide button 51b2 is mouse clicked, then the browser display 40 of author introduction corner shown in FIG. 9 can be displayed. This introduction corner comprises a frame where the author can write freely. Furthermore, if an author fan button 51b3 is mouse clicked, then it is possible to move to the room of an electronic bulletin board where a dialogue between the author and the fan is possible.

When a purchaser wishes to make a purchase from the Music Patron Club, the browser screen 40 shown in FIG. 8(a) is displayed in the purchaser system. By inputting the desired musical genre or artist name in the input frame 52c and mouse clicking the click button 51c1, the purchaser can display a music salon (download) shown in FIG. 8(b). If after listening to the music which is to be purchased, the person clicks a download button 51c4, and the music contents 6 can be transmitted from the computer 1 to the purchaser system 5 via the network 2. In the Music Patron Club, payment of a purchase cost is conducted by using the network cost settlement agent service already established at the time of download for servicing those who have completed heretofore the member registration procedure.

The person wishing to become a supporter connects his/her own system (referred to hereinbelow as a system 4 of the supporter) to internet 2a, accesses the web page opened in the administrator computer 1, and sends a request displayed in FIG. 3(a). As a result, the browser screen 40 shown in FIG. 10 is displayed on the display of the supporter system via the browser software. If the click button 51d1 is mouse clicked, the guidelines relating to the terms and conditions of the contract to be established between a supporter and the administrator are displayed. When a person wishes to become a supporter, then the necessary input including the music which is the object of support and the investment amount is made in the input frame 52d and then the input results are sent by mouse clicking the send button 51d2. As a result, the declaration of support intent shown in FIG. 3(a) is sent. Payment of the support money is conducted by the method (bank transfer and the like) indicated by the system administrator. Upon confirmation of money reception, the personal identification information is transferred from the computer of the administrator to the supporter system and the payment information is stored in the supporter database 14.

When a supporter wishes to check the earnings status, if access is made from the supporter system 4, then the browser screen 40 shown in FIG. 11(a) is displayed via the browser software on the display of supporter system. The earnings status of the entire Music Patron Club can be displayed by clicking the click button 51e1. If the click button 51e2 is mouse clicked upon inputting the ID code and password as the personal identification information of the supporter in the input frame 52e, then the earnings results 43a are displayed in the browser screen 40 shown in FIG. 11(b). This display shows the status of earnings which are to be received by supporters; total earnings and earnings per musical item are displayed herein.

When a contents provider wishes to check the earnings status, the browser screen 40 shown in FIG. 12(a) is similarly displayed via the browser software on the display of the system of the contents provider. If the click button 51f1 is mouse clicked upon inputting the ID code and password in the input frame 52f, then the earnings results 43b for the contents provider shown in FIG. 12(b) are displayed.

As described hereinabove, in accordance with the present invention, the object of purchasing the intellectual contents by a purchaser is not limited to individual usage. For example, the purchaser may be a broadcasting corporation purchasing a musical performance for subsequent broadcasting, or the purchase can be made for reproducing the musical performance in the places of meeting where a large number of people are present. In FIG. 11 and FIG. 12, the "earnings of copyright segment 1" represent earnings based on the purchase cost received from the person who made the purchase with the object of individual use, and the "earnings of copyright segment 2" represent earnings based on the purchase cost received from the person who made the purchase with the object other than individual use. In the present embodiment, the total is determined separately for the two groups.

In the prior art, even when the artists (an assemblage of author and performers) used a sound source that they have recorded by themselves, if this sound source was brought to a record company and marketed on CD, then the artists could receive not more than about 5% of the total proceeds of sales. Further, even when the artists tried to store the contents in their own web page and distribute it via the network, the proceeds of sales could not be improved because of insufficient advertisement.

In contrast, employing the present invention in the form of a Music Patron Club makes it possible for the artist to obtain a lump sum as a share from the support sum received from the supporters and also to increase the popularity of the Music Patron Club and the contents that are provided by the artist by means of advertisement activity of the supporters, thereby effectively increasing the proceeds of sales via net distribution. Furthermore, the share of the artist who thus increased the sales also rises by comparison with that obtained in the case of selling via the record company. Thus, the artist can get about 50% of proceeds of sales, including the lump sum received and the support sum.

The supporter can increase earnings in excess of the contribution made as a support sum by investing the initial support sum and then diligently working on public advertisement of the contents.

Because the administrator is not required to bear the expense of CD manufacture or circulation and promotion activity, the administration expenses can be reduced. As a result, earnings can be substantially increased even if the contents price is decreased and the share ratio of the administrator in the proceeds of sales is decreased.

INDUSTRIAL USE

The present invention relates to a method for distributing the intellectual contents such as music, musical performances, movies, art, literature, comics, computer software, and the like from a computer via a network, wherein the distribution system solicits supporters for supporting the contents which are to be distributed. The activity of intellectual contents providers such as performers is supported by the financial aid of supporters and the sales results of the intellectual contents such as music are increased, for example, by the advertisement activity of supporters. Therefore, the earnings of contents providers and distribution system administrators can be increased based on the support money and the increase in sales. The supporter can receive earnings according to the support results and sale results.

In accordance with the present invention the earnings which are to be returned to the contents provider and supporters are computed by using the support results and purchase results stored in a computer and the computation results can be checked at any time by the contents provider or supporters via a network. Therefore, the contents provider and supporters can safely trust the administration to the administrator.

In accordance with the present invention, a person can be identified by personal identification information assigned to the contents provider and supporters. Therefore, the individual earnings results can be sent to personal systems from the administrator system via a network.

In accordance with the present invention, a specific feature of the distribution method—support method is that information can be sent to a wide range of systems of unspecified persons via a network. Therefore, any person wishing to provide contents, or to support or purchase the contents can receive this information and use the distribution system.

What is claimed is:

1. An intellectual contents distribution method for distributing intellectual contents from a computer via a network, the computer being connectable to a contents provider terminal of a contents provider, user terminal of a user, at least one supporter terminal of at least one supporter, and a purchaser terminal of a purchaser, and the intellectual contents provided from the contents provider and support results from the at least one supporter relating to the intellectual contents being stored in the computer, the support results being based on money received from the at least one supporter, the intellectual contents distribution method comprising:

creating, by the contents provider terminal, the intellectual contents in a distributable digital format;

distributing the intellectual contents by the computer via the network;

receiving, by the computer, support for the intellectual contents from the user terminal after the user views the intellectual contents;

receiving, by the computer, money transferred from the user terminal for the support of the intellectual contents;

transferring, upon confirmation of money reception, personal identification information from the computer to the user terminal;

identifying, by the computer, the user terminal as the at least one supporter terminal and the personal identification information from the user terminal as personal identification information from the at least one supporter based on the personal identification information;

transmitting the entirety of the intellectual contents from the computer to the purchaser terminal via the network in response to the purchaser purchasing the intellectual contents;

storing purchase results relating to the purchase of the intellectual contents in the computer;

computing and reviewing earnings to be received by the contents provider and earnings to be received by the at least one supporter with the computer by using the support results and the purchase results stored in the computer, the computing and reviewing earnings to be received by the at least one supporter at any time in response to a request from the at least one supporter; and transmitting information on the earnings from the computer to the at least one supporter terminal via the network, the information being earnings to be received by the at least one supporter based on the support results and the purchase results of the intellectual contents in response to the support from the user.

2. The intellectual contents distribution method as described in claim 1, further comprising transmitting actual current earnings to be received by the contents provider or the at least one supporter from the computer via the network to the contents provider terminal or the at least one supporter terminal, in response to a request from the contents provider or the at least one supporter.

3. The intellectual contents distribution method as described in claim 2, further comprising assigning, by the computer, personal identification information to the contents provider, wherein transmission of information relating to the contents provider and the at least one supporter is conducted when at least one of the personal identification information from the contents provider terminal and the personal identification information from the at least one supporter terminal has been received via the network.

4. The intellectual contents distribution method as described in claim 1, further comprising transmitting information on the intellectual contents distribution method for distributing the intellectual contents via the network, information indicating that a provision of the contents has been solicited, information relating to a method for support employed by the at least one supporter, and information on the earnings to be received by the contents provider in response to the support results and sale results in response to the declaration support from the user to the user terminal.

5. The intellectual contents distribution method as described in claim 1, further comprising transmitting information on the intellectual contents distribution method for distributing the intellectual contents via the network, information indicating that the at least one supporter has been solicited with respect to the contents provided from the contents provider, and information relating to a method for support employed by the at least one supporter.

6. The intellectual contents distribution method as described in claim 1, further comprising transmitting information on the contents that have been stored, information indicating that the contents can be received via the network, and information indicating that the contents can be purchased in response to a request from the user to the user terminal.

7. The intellectual contents distribution method as described in claim 6, wherein the information on the stored contents comprises information provided by the contents provider, and the information provided by the contents provider is freely updatable in response to accessing by the contents provider to the computer via the network.

8. The intellectual contents distribution method as described in claim 1, further comprising transmitting the entirety of the intellectual contents to purchaser terminal via the network in response to the request from the purchaser, irrespective of whether a declaration of purchase intention by the purchaser is present or not, and the declaration of purchase intention by the purchaser is received thereafter.

9. The intellectual contents distribution method as described in claim 1, further comprising assigning personal identification information to the purchaser in response to the request from the purchaser, wherein the computer can identify the purchaser by the personal identification information after the assigning of the personal identification information.

10. An intellectual contents distribution system for distributing the intellectual contents from a computer via a network, the intellectual contents distribution system comprising:

the computer, a contents provider terminal of a contents provider, a user terminal of a user, at least one supporter terminal of at least one supporter, and a purchaser terminal of a purchaser to the computer that are connected to each other via the network;

a contents storage that stores the intellectual contents provided from the contents provider, the intellectual contents being created in a distributable digital format by the contents provider terminal and distributed by the computer via the network;

a supporter storage that stores support results of support from the at least one supporter corresponding to the intellectual contents; and a purchase storage that stores purchase results of a purchase of the intellectual contents by the purchaser;

wherein when the computer receives the support from the user terminal after the user views the intellectual contents created by the contents provider terminal, upon confirmation of money reception from the user terminal, the computer transfers personal identification information to the user terminal, and the computer identifies the user terminal as the at least one supporter terminal based on the personal identification information, wherein the computer transmits the entirety of the intellectual contents to the purchaser terminal via the network in response to the purchase by the purchaser, and the computer computes earnings which are to be returned to the contents provider and earnings which are to be returned to the at least one supporter by using the support results stored in the supporter database and the purchase results stored in the purchase database, the earnings which are to be returned to the at least one supporter are returned at any time in response to a request from the at least one supporter, and wherein the computer transmits information on the earnings to the at least one supporter terminal via the network, the information being earnings to be received by the at least one supporter based on the support results and the purchase results of the intellectual contents, in response to the support from the user.

11. The intellectual contents distribution system as described in claim 10, wherein the computer computes actual current earnings to be received by the contents provider or the at least one supporter in response to a request from the contents provider or the at least one supporter and computation results are transmitted from the computer to the contents provider terminal or the at least one supporter terminal via the network.

12. The intellectual contents distribution system as described in claim 10, wherein the computer transmits, to the user terminal via the network, information on the intellectual contents distribution system for distributing the intellectual contents via the network, information indicating that a provision of the contents has been solicited, information relating to a method for support employed by the at least one supporter, information indicating that at least one supporter has been solicited with respect to the contents provided from the contents provider, information on the stored contents, information indicating that the contents can be received via the network, and information indicating that the contents can be purchased in response to a request from the user.

13. The intellectual contents distribution system as described in claim 12, wherein the information on the stored contents comprises information provided by the contents provider and, the information provided by the contents provider is freely updatable in response to accessing by the contents provider to the intellectual contents distribution system via the network.

14. The intellectual contents distribution system as described in claim 10, wherein the entirety of the intellectual contents is transmitted to the purchaser terminal via the network in response to the request from the purchaser via the network in response to the request from the purchaser, irrespective of whether a declaration of purchase intent by the purchaser is present or not, and the declaration of purchase intent by the purchaser is received thereafter.

15. A non-transitory computer readable medium containing an intellectual contents distribution program that, when executed by a computer, causes the computer to perform:
connecting a contents provider terminal of a contents provider, a user terminal of a user, at least one supporter terminal of at least one supporter, and a purchaser terminal of a purchaser;
creating the intellectual contents in a distributable digital format;
distributing the intellectual contents via the network;
storing intellectual contents provided from the contents
storing support results from the at least one supporter corresponding to the intellectual contents;
storing purchase results of the intellectual contents;
storing purchase results of the contents;
when the computer receives support from the user terminal after the user views the intellectual contents, upon confirmation of money reception, transferring personal identification information to the user terminal, and to identifying the user terminal as the at least one supporter terminal based on the personal identification information,
transmitting the entirety of the intellectual contents to the purchaser terminal via the network in response to a purchase by the purchaser, and computing earnings which are to be returned to the contents provider and earnings which are to be returned to the at least one supporter by using the support results stored in the supporter database and the purchase results stored in the purchase database, the earnings which are to be returned to the at least one supporter are returned at any time in response to a request from the at least one supporter; and
transmitting information on the earnings via the network, the information being earnings to be received by the at least one supporter based on the support results and sale results of the intellectual contents, in response to the support from the user to the user terminal.

16. The non-transitory computer readable medium as described in claim 15, wherein the computer is caused to transmit the entirety of the intellectual contents to the purchaser terminal via the network in response to the request from the purchaser irrespective of whether a declaration of purchase intent by the purchaser is present or not, and the declaration of purchase intent by the purchaser is received thereafter.

17. An intellectual contents distribution method for distributing intellectual contents from a computer via a network, the computer being connectable to a contents provider terminal of a contents provider, a user terminal of a user, at least one supporter terminal of at least one supporter, and a purchaser terminal of a purchaser, the computer having a contents database for storing a plurality of intellectual contents provided from the contents provider, a supporter database, a purchase database, the intellectual contents distribution method comprising:
creating, by the system of the contents provider, the intellectual contents in a distributable digital format;
distributing the intellectual contents by the computer via the network;
receiving, by the computer, a declaration of support for supported intellectual contents selected from among the stored plurality of intellectual contents from the user terminal after the user views the intellectual contents;
transferring personal identification information from the computer to the user terminal;
transmitting the declaration of support for the supported intellectual contents from the computer to the at least one supporter terminal, when receiving payment information of a support sum for the supported intellectual contents;
identifying, by the computer, the user terminal as the at least one supporter terminal and the personal identification information from the user terminal as personal identification information from the at least one supporter based on the personal identification information;
storing the support results from the supporter that corresponds to the contents in the supporter database, the support results including payment information and the support sum of the supporter with the personal identification information;

transmitting the entirety of the intellectual contents from the computer to the purchaser terminal via the network in response to the purchaser purchasing the contents;

storing purchase results relating to the contents in the purchase database, the purchase results including the number of purchase contract establishment events and the number of price payments;

computing and reviewing earnings to be received by the contents provider and earnings to be received by the at least one supporter with the computer based on a predetermined computational formula by using the support results stored in supporter database and the purchase results stored in the purchase database, the predetermined computational formula using the distribution rule between the contents provider and the supporter for each of the intellectual contents, the computing and reviewing earnings to be received by the at least one supporter at any time in response to a request from the at least one supporter; and transmitting information on the intellectual contents distribution method for distributing the intellectual contents to the at least one supporter terminal via the network, information indicating that a provision of the intellectual contents has been solicited, information relating to a method for support employed by the at least one supporter, and information on the earnings to be received by the contents provider in response to the support results and the purchase results in response to the declaration from the user.

18. An intellectual contents distribution system for distributing the intellectual contents from a computer via a network, the intellectual contents distribution system comprising:

the computer, a contents provider terminal of a contents provider, a user terminal of a user, at least one supporter terminal of at least one supporter, and a purchaser terminal of a purchaser that are connected to each other via the network;

a contents storage that stores a plurality of intellectual contents provided from the contents provider, the intellectual contents being created in a distributable digital format by the contents provider terminal and distributed by the computer via the network;

a supporter storage that stores support results of support from the at least one supporter corresponding to the intellectual contents, the support results including payment information and the support sum of the supporter with personal identification information; and a purchase storage that stores purchase results of a purchase of the intellectual contents by the purchaser, the purchase results including the number of purchase contract establishment events and the number of price payments;

wherein when the computer receives a declaration of support for supported intellectual contents from among the plurality of intellectual contents from the user terminal after the user views the intellectual contents created by the contents provider terminal, the computer transfers the personal identification information to the user terminal, and the computer identifies the user terminal as the at least one supporter terminal based on the personal identification information; and the computer transmits information on the intellectual contents distribution system for distributing the intellectual contents to the purchaser terminal via the network, the computer transmits, the at least one supporter terminal via the network, the declaration of support for the supported intellectual contents when receiving payment information of support sum from the supported intellectual contents, information indicating that a provision of the intellectual contents has been solicited, information relating to a method for support employed by the at least one supporter, information on the earnings to be received by the contents provider in response to the support results and the purchase results in response to the declaration from the user to the user terminal, information indicating that at least one supporter has been solicited with respect to the intellectual contents provided from the contents provider, information on the stored intellectual contents, information indicating that the intellectual contents can be received via the network, and information indicating that the intellectual contents can be purchased in response to a request from the user, wherein the computer transmits the entirety of the intellectual contents to the purchaser terminal via the network in response to the purchase by the purchaser, and the computer computes earnings which are to be returned to the contents provider and earnings which are to be returned to the at least one supporter based on a predetermined computational formula by using the support results stored in the supporter database and the purchase results stored in the purchase database, the computational formula having a distribution rule between the contents provider and the supporter for each of the intellectual contents, the earnings which are to be returned to the at least one supporter are returned at any time in response to a request from the at least one supporter.

* * * * *